Dec. 5, 1939.   A. VOGT   2,182,064
APPARATUS FOR TREATING MATTERS IN HOT LIQUID STATE
Original Filed Oct. 31, 1935   2 Sheets-Sheet 2

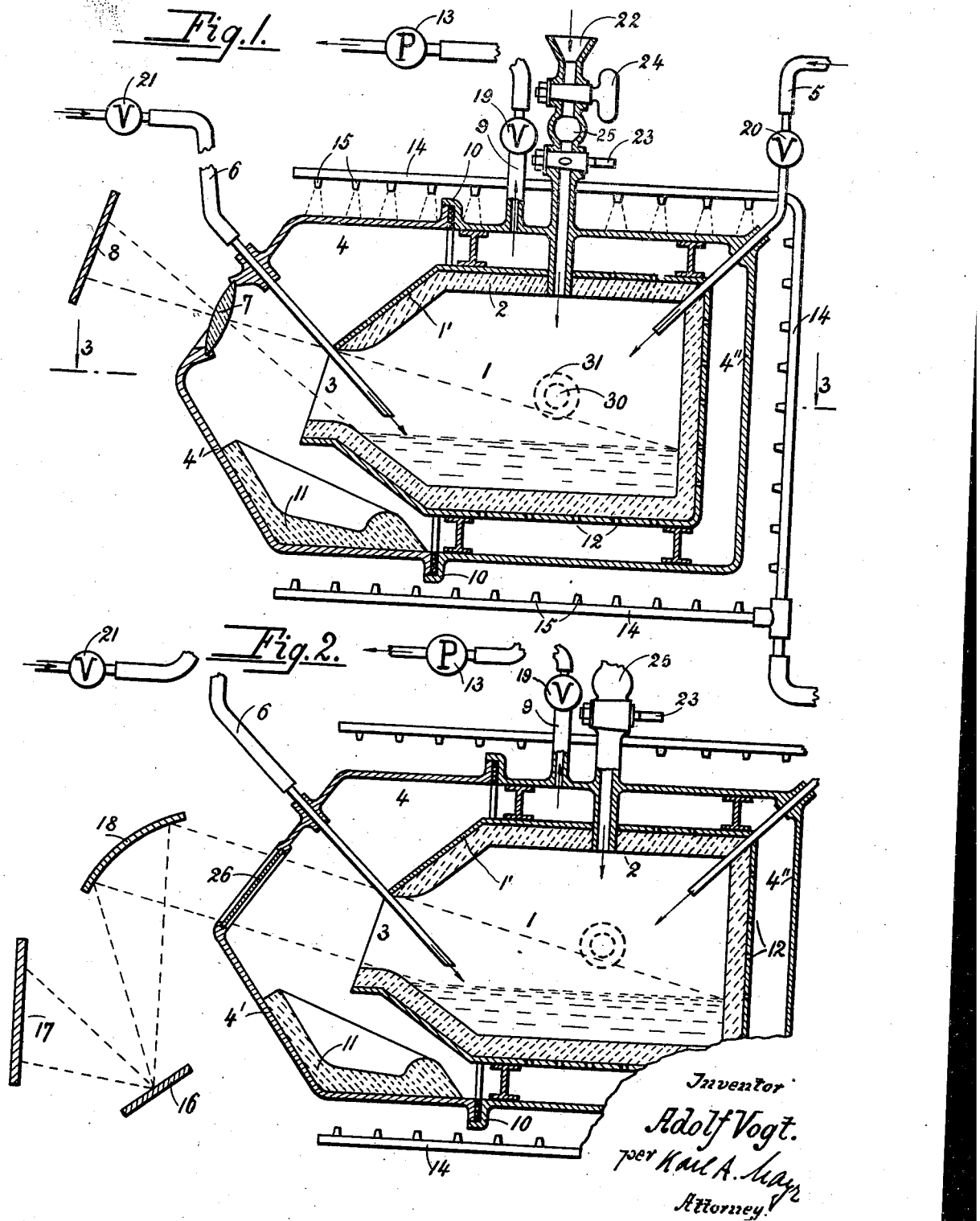

Inventor
Adolf Vogt.
per Karl A. Mayr.
Attorney.

Patented Dec. 5, 1939

2,182,064

UNITED STATES PATENT OFFICE 2,182,064

APPARATUS FOR TREATING MATTERS IN HOT LIQUID STATE

Adolf Vogt, Kraftborn, near Breslau, Germany, assignor to Dr. Alexander Wacker Gesellschaft für Elektrochemische Industrie G. m. b. H., Munich, Germany, a corporation Original application October 31, 1935, Serial No. 47,618. Divided and this application June 9, 1937, Serial No. 147,372. In Germany November 23, 1934

2 Claims. (Cl. 266—34)

The present invention relates to an apparatus for removing oxidizable matters, for example carbon, from materials as, for example, iron or iron alloys. In the apparatus according to the present invention, materials which contain oxidizable matters, for example, ferrochrome containing carbon, are treated in hot liquid state with oxygen or gases containing oxygen at a pressure which is below atmospheric pressure.

The present application is a division of my application Ser. No. 47,618, filed Oct. 31, 1935, which matured into Patent No. 2,093,666 of Sept. 21, 1937.

An object of the present invention resides in the provision of an apparatus for removing carbon from matters such as iron or iron alloys in hot molten state, said apparatus comprising a container in which said matters are enclosed and in which the pressure is gradually reduced and in which said matters are treated with pure oxygen or a gas of high oxygen content.

A further object of the present invention is to provide an apparatus for removing carbon from matters such as iron or iron alloys in hot molten state, said apparatus comprising a container in which said matters are enclosed and in which a low pressure is maintained and in which said matters are treated with pure oxygen or a gas of high oxygen content.

Another object of this invention is the provision of an apparatus for removing carbon from matters such as iron or iron alloys in hot molten state, said apparatus comprising a container in which said matters are enclosed and in which the pressure is reduced and in which said matters are treated with pure oxygen or a gas of high oxygen content, said apparatus also comprising means for controlling the level and boiling action of the molten matters by controlling the pressure within said container.

A further object of this invention resides in the provision of an apparatus for removing carbon from matters such as iron or iron alloys in a hot molten state, said apparatus comprising a container in which said matters are enclosed and in which the pressure is reduced and in which said matters are treated with pure oxygen or a gas of high oxygen content, said apparatus also comprising means for controlling the level and boiling action of said molten matters by blowing air into a particularly hot region of said container.

Another object of the present invention is to provide an apparatus for removing oxidizable matters from materials in hot liquid state by treating said materials with oxygen or gas of high oxygen content and low pressure, said apparatus comprising a laterally open, tiltable vessel for holding the molten material, a closable and tiltable container surrounding said vessel, oxygen and air supply conduits extending into said vessel, and a suction conduit associated with said container.

A further object of the present invention is the provision of an apparatus for removing oxidizable matters from materials in hot liquid state by treating said materials with oxygen or gas of high oxygen content and low pressure, said apparatus comprising a tiltable, laterally open vessel for holding the molten material, a closable also tiltable container surrounding said vessel, optical means adapted to optically cooperate with the lateral opening in said vessel and being adapted to project a picture of the surface of the molten material within said vessel onto a surface outside of said apparatus and to make that picture visible over large distances.

Further and other objects of the present invention will be hereinafter set forth in the accompanying specification and claims and shown in the drawings which, by way of illustration, show what I now consider to be a preferred embodiment of my invention.

In the drawings:

Fig. 1 is a diagrammatic cross sectional view of an apparatus according to my invention.

Fig. 2 is a diagrammatic showing of a part of the apparatus shown in Fig. 1 and showing a modification of the means for observing the interior of the apparatus in operation.

Like parts are designated by like numerals in all figures of the drawings.

Figure 3:
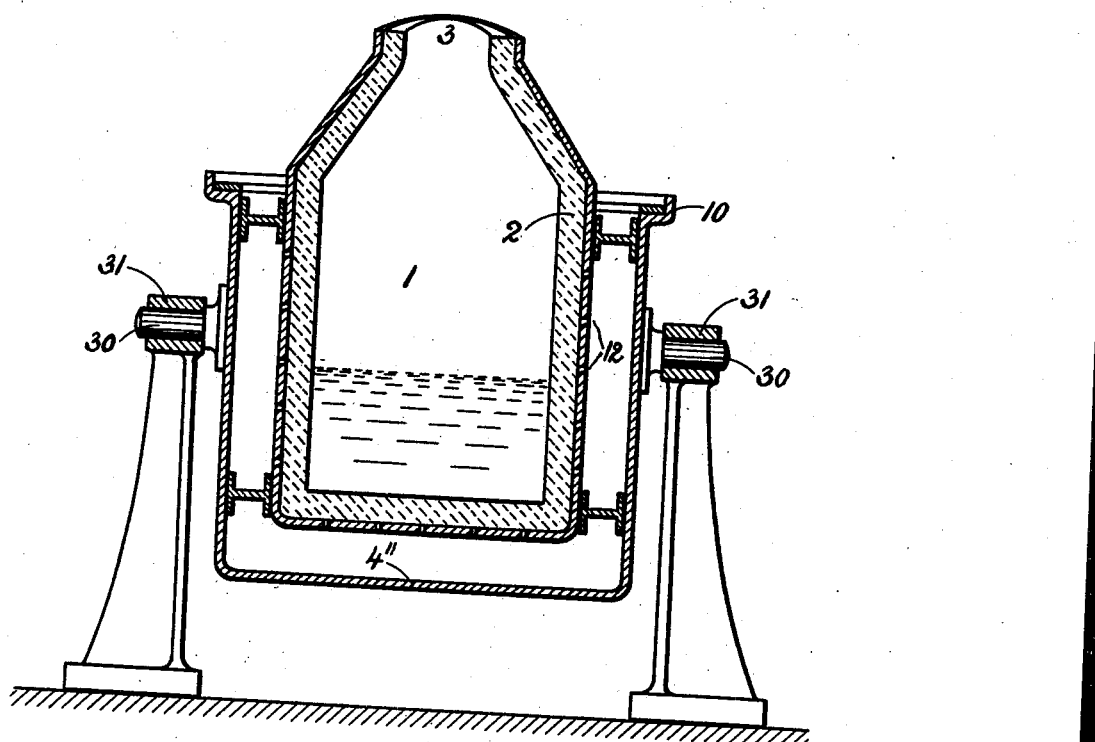
Fig. 3 is a diagrammatic sectional showing of the apparatus according to the present invention in upright position and with the cover removed.

In the figures: I is a container for holding the molten material and having an opening 3; the container is lined with a layer 2 of high temperature resisting material. It is advisable to provide openings 12 in the walls 1' of container 1, which are round, slot-shaped or of other suitable configuration and located particularly in that part of the container walls which is below the level of the surface of the molten material. These openings permit escape of air, which may be contained in layer 2, through the exterior wall of container 1 so that little or no air goes into the bath of molten material when evacuation of the container is started. The pressure prevailing on the outside of openings 12 is lower than the pressure on the inside of lining 2 on which the molten material rests, and the air contained in lining 2 goes the easy way which is out through holes 12 and not through the bath when evacuation is started. Container 1 is located within a closable casing 4 which is of sufficient size to provide space all around container 1 and between container 1 and casing 4. Conduits 5 and 6 are provided, extending through the walls of casing or chamber 4 into the interior of container 1. One conduit serves for introducing oxygen or gases of high oxygen content, the other for introducing air or gas for controlling the pressure in container 1 and chamber 4. Air and gases are withdrawn from casing 4 through duct 9 which leads to pump 13 and produces the desired low pressure within chamber 4 and container 1. A valve 19 may be provided in duct 9 for controlling the amount of gas removed and the pressure within the chamber.

Casing 4 is preferably made up of two sections 4' and 4'' which are disconnectably interconnected by means of flange 10. The part of section 4' located underneath opening 3 of container 1 is lined with high temperature resisting material 11 which has the shape of a tray. Opposite the opening 3 of container 1, a lens 7 is inserted into the wall of chamber 4, which lens projects a picture of the surface of the bath of molten material within container 1 to a surface 8 which is outside of chamber 4 and visible to the operator, even when the latter is remote from chamber 4. Supervision of the process is thus possible in an indirect manner which is more convenient and less dangerous. Instead of a lens, other optical devices such as concave mirrors or the like may be used. Such an arrangement is shown in Fig. 2. The image of the bath surface is projected through a transparent plate 26 to the outside and by means of concave mirror 18 to mirror 16 and therefrom to screen 17.

In order to make the apparatus tiltable, bosses 30 are connected with casing 4 which are revolvable in bearings 31, and conduits 5, 6, 9, and 14 are provided with flexible hose means.

As long as the molten material is treated with gases at atmospheric pressure, the apparatus may be used in upright position, i. e., with opening 3 at the upper end of the apparatus and part 4', which is on the left of flange 10 in Figs. 1 and 2, removed as is shown in Fig. 3 of the drawings. The horizontal position as shown in Figs. 1 and 2 with opening 3 at the side and part 4' tightly connected to part 4'' is used when carrying out the process at a pressure which is below atmospheric pressure. As soon as pump 13 is started, a vacuum is developed in chamber 4 and container 1. The gases for treating the molten material are introduced through conduit 6 and directed towards the surface of the bath of molten material. If the pressure within container 1 becomes too low and the molten material foams or rises too high, gas or air is introduced through conduit 6. Conduits 5 and 6 are provided with valves 20 and 21, respectively, for controlling the amount of gas flowing therethrough. Material flowing over through opening 3 is collected in the tray formed by lining 11. The apparatus may be cooled by spraying water on to the outside of chamber 4. Pipe 14 having nozzles 15 serves for this purpose.

For introducing deoxidizing matters into container 1 during the process, a conduit 22 is provided having two valves 23 and 24 with a chamber 25 in between. The matters are first introduced into chamber 25 with valve 24 open and valve 23 closed. Then valve 24 is closed and valve 23 opened so that the matters drop into container 1.

When the treating process is completed, vacuum pump 13 is stopped, and part 4' of chamber 4 is removed after the pressure inside the chamber has reached atmospheric pressure. The molten material can then be taken out by tilting container 1.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. An apparatus for treating hot molten materials with a gas at low pressure comprising a container having an opening and a closed casing surrounding said container, said container having walls made of nonporous material, said walls being lined internally with a high temperature resisting porous lining, said walls being provided with a plurality of openings whereby the air or gas contained in the lining escapes through said openings into the outer space enclosed by said casing.

2. An apparatus for treating hot molten materials with gas at low pressure comprising a container having an opening and a closed casing surrounding said container, said container being lined internally with a high temperature resisting material and having walls provided with a plurality of openings in that portion which is normally below the molten material level whereby the air or gas contained in the portions of said high temperature resisting material covered by the molten material escapes into the outer space enclosed by said casing.

ADOLF VOGT.